(12) United States Patent
Awad et al.

(10) Patent No.: US 8,665,781 B2
(45) Date of Patent: *Mar. 4, 2014

(54) ADAPTIVE MODULATION AND CODING

(75) Inventors: Yassin Aden Awad, Middlesex (GB); Michiharu Nakamura, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 1280 days.

This patent is subject to a terminal disclaimer.

(21) Appl. No.: 11/783,157

(22) Filed: Apr. 6, 2007

(65) Prior Publication Data

US 2007/0189210 A1    Aug. 16, 2007

Related U.S. Application Data

(62) Division of application No. 10/629,386, filed on Jul. 29, 2003, now abandoned.

(30) Foreign Application Priority Data

Jul. 30, 2002 (GB) .................................. 0217654.3

(51) Int. Cl.
*H04B 7/00* (2006.01)

(52) U.S. Cl.
USPC ........... 370/328; 370/252; 370/329; 370/341; 370/358; 370/465; 455/102; 455/522; 455/515; 455/108; 455/509

(58) Field of Classification Search
USPC .............. 370/212, 358, 252, 226.3, 468, 522, 370/465, 328–329; 455/102, 522, 515, 69, 455/226.1, 67–67.11, 423, 422.1, 450; 375/227, 140, 337
See application file for complete search history.

(56) References Cited

U.S. PATENT DOCUMENTS

| | | | |
|---|---|---|---|
| 5,241,690 A | | 8/1993 | Larsson |
| 5,946,346 A | | 8/1999 | Ahmed |
| 6,108,374 A | * | 8/2000 | Balachandran et al. ....... 375/227 |
| 6,167,031 A | | 12/2000 | Olofsson |
| 6,683,916 B1 | | 1/2004 | Sartori |
| 6,701,129 B1 | * | 3/2004 | Hashem et al. ............ 455/67.11 |
| 6,751,187 B2 | | 6/2004 | Walton |
| 6,985,752 B2 | * | 1/2006 | Takano et al. ................. 455/522 |
| 7,043,210 B2 | * | 5/2006 | Zhu et al. ...................... 455/102 |

(Continued)

FOREIGN PATENT DOCUMENTS

| | | |
|---|---|---|
| EP | 1217861 | 6/2002 |
| JP | 2002-64424 | 2/2002 |

(Continued)

OTHER PUBLICATIONS

Non-Final Office Action received in U.S. Appl. No. 11/783,158 dated Sep. 11, 2009.

(Continued)

*Primary Examiner* — Kiet Doan
*Assistant Examiner* — Michael T Vu
(74) *Attorney, Agent, or Firm* — Smith, Gambrell & Russell, LLP

(57) ABSTRACT

A user equipment, for use in a wireless communication system, includes a unit operable to measure a received signal quality in a receiver, a unit operable to report the measuring received signal quality to the transmitter, or a unit operable to report a selected modulation and coding scheme to the transmitter.

3 Claims, 18 Drawing Sheets

(56) References Cited

U.S. PATENT DOCUMENTS

| | | | |
|---|---|---|---|
| 7,206,332 B2 * | 4/2007 | Kwan et al. | 375/140 |
| 7,236,474 B2 | 6/2007 | Seo | |
| 2001/0053124 A1 | 12/2001 | Ichihara | |
| 2002/0010001 A1 * | 1/2002 | Dahlman et al. | 455/522 |
| 2002/0099526 A1 | 7/2002 | Patterson et al. | |
| 2002/0183010 A1 | 12/2002 | Catreux | |
| 2002/0183020 A1 | 12/2002 | Zhu | |
| 2002/0187799 A1 | 12/2002 | Haartsen | |
| 2003/0022629 A1 | 1/2003 | Miyoshi et al. | |
| 2003/0123559 A1 | 7/2003 | Classon | |
| 2004/0105460 A1 | 6/2004 | Mogensen | |

FOREIGN PATENT DOCUMENTS

| | | |
|---|---|---|
| JP | 2-199033 | 7/2002 |
| WO | WO 00/01105 | 1/2000 |
| WO | 0049760 | 8/2000 |
| WO | WO 01/93471 A1 | 12/2001 |
| WO | WO 02/41530 A1 | 5/2002 |

OTHER PUBLICATIONS

Japanese Official Action dated Sep. 30, 2008 with Eng. Translation in the corresponding Japanese Application No. 2003-282158.
European Search Report for EP08164604 (Nov. 19, 2008).
NEC, Telecom Modus: "Selection of MCS Levels in HSDPA" TSG-RAN Working Group 1, May 21-25, 2001, pp. 1-4, XP002262799, Busan, Korea.
Final Office Action dated Jun. 28, 2010 received in U.S. Appl. No. 10/629,386.
Final Office Action dated Sep. 1, 2010 received in U.S. Appl. No. 11/783,155.
Final Office Action dated Apr. 2, 2010 received in U.S. Appl. No. 11/783,158.
Final Office Action date Apr. 14, 2010 received in U.S. Appl. No. 11/783,155.
Non-Final Office Action received in U.S. Appl. No. 10/629,386 dated Oct. 17, 2007.
Final Office Action received in U.S. Appl. No. 10/629,386 dated Jun. 27, 2008.
Non-Final Office Action received in U.S. Appl. No. 10/629,386 dated Jan. 13, 2009.
Non-Final Office Action received in U.S. Appl. No. 11/783,156 dated Jun. 12, 2009.
Non-Final Office Action received in U.S. Appl. No. 11/783,155 dated Sep. 16, 2009.
Non-Final Office Action received in U.S. Appl. No. 11/783,159 dated Aug. 13, 2009.
Non-Final Office Action dated Jun. 7, 2011 received in U.S. Appl. No. 11/783,155.
Notice of Allowance dated Apr. 14, 2011 received in U.S. Appl. No. 11/783,155.
Non-Final Office Action dated Sep. 30, 2009 received in U.S. Appl. No. 10/629,386.
Non-Final Office Action dated Dec. 15, 2010 received in U.S. Appl. No. 11/783,155.
Notice of Allowance dated Oct. 18, 2011 received in U.S. Appl. No. 11/783,155.
Notice of Allowance dated Jul. 9, 2013 received in U.S. Appl. No. 11/783,159.
Notice of Allowance dated Feb. 27, 2013 received in U.S. Appl. No. 11/783,156.
Notice of Allowance dated Jan. 7, 2010 received in U.S. Appl. No. 11/783,156.
Final Office Action dated Jan. 27, 2010 received in U.S. Appl. No. 11/783,159.

* cited by examiner

| MCS Number | 1 | 2 | 3 | 4 | 5 | 6 | 7 | 8 |
|---|---|---|---|---|---|---|---|---|
| Modulation Scheme | QPSK | QPSK | 8PSK | 8PSK | 16QAM | 16QAM | 64QAM | 64QAM |
| Spreading Factor SF | 16 | 16 | 16 | 16 | 16 | 16 | 16 | 16 |
| Symbols/slot | 160 | 160 | 160 | 160 | 160 | 160 | 160 | 160 |
| Bits/slot | 320 | 320 | 480 | 480 | 640 | 640 | 960 | 960 |
| TTI (ms) | 2 | 2 | 2 | 2 | 2 | 2 | 2 | 2 |
| Number Of slots/frame | 3 | 3 | 3 | 3 | 3 | 3 | 3 | 3 |
| Bits/frame | 960 | 960 | 1440 | 1440 | 1920 | 1920 | 2880 | 2880 |
| TPC, TFCI and Pilot | 0 | 0 | 0 | 0 | 0 | 0 | 0 | 0 |
| Code Length RF | 960 | 960 | 1440 | 1440 | 1920 | 1920 | 2880 | 2880 |
| Padding | 0 | 2 | 0 | 2 | 0 | 2 | 0 | 2 |
| Code Length RM (Rate*DataLength + Tail bit) | 960 | 958 | 1440 | 1438 | 1920 | 1918 | 2880 | 2878 |
| Rate (selected rates) | Rate 1/2 | Rate 3/4 | Rate 1/2 | Rate 3/4 | Rate 1/2 | Rate 3/4 | Rate 1/2 | Rate 3/4 |
| Code Length (3*DataLength + 4*(k-1)) | 1443 | 2154 | 2163 | 3234 | 2883 | 4314 | 4323 | 6474 |
| K-1 | 3 | 3 | 3 | 3 | 3 | 3 | 3 | 3 |
| Data Length | 477 | 714 | 717 | 1074 | 957 | 1434 | 1437 | 2154 |
| CRC Length | 24 | 24 | 24 | 24 | 24 | 24 | 24 | 24 |
| InfoData Length | 453 | 690 | 693 | 1050 | 933 | 1410 | 1413 | 2130 |
| InfoData Rate | 226.5 Kbps | 345 Kbps | 346.5 Kbps | 525 Kbps | 466.5 Kbps | 705 Kbps | 706.5 Kbps | 1065 Kbps |
| Number of Multicodes | 10 | 10 | 10 | 10 | 10 | 10 | 10 | 10 |
| Data Rate x Multicodes | 2.265 Mbps | 3.450 Mbps | 3.465 Mbps | 5.250 Mbps | 4.665 Mbps | 7.050 Mbps | 7.065 Mbps | 10.650 Mbps |

Fig. 17

ADAPTIVE MODULATION AND CODING

CROSS-REFERENCE TO RELATED APPLICATIONS

This application is a divisional of U.S. application Ser. No. 10/629,386, filed Jul. 29, 2003 now abandoned, which is a continuation of Great Britain Application No. 0217654.3, filed Jul. 30, 2002, which are hereby incorporated by reference herein in their entirety.

BACKGROUND OF THE INVENTION

1. Field of the Invention

The present invention relates to adaptive modulation and coding methods and apparatus for use, for example, in wireless communication systems.

2. Description of the Related Art

FIG. 1 shows parts of a wireless communication system 1. The system includes a plurality of base stations 2, only one of which is shown in FIG. 1. The base station 2 serves a cell in which a plurality of individual users may be located. Each user has an individual user equipment (UE). Only the user equipments UE2, UE11 and UE50 are shown in FIG. 1. Each UE is, for example, a portable terminal (handset) or portable computer.

As is well known, in a code-division multiple access (CDMA) system the signals transmitted to different UEs from the base station (also known as "node B") are distinguished by using different channelisation codes. In so-called third generation wireless communication systems a high speed downlink packet access (HSDPA) technique has been proposed for transmitting data in the downlink direction (from the base station to the UEs). In this technique a plurality of channels are available for transmitting the data. These channels have different channelisation codes. For example, there may be ten different channels C1 to C10 available for HSDPA in a given cell or sector of a cell. In HSDPA, downlink transmissions are divided up into a series of transmission time intervals (TTI) or frames, and a packet of data is transmitted on each different available channel to a selected UE. A new choice of which UE is served by which channel can be made in each TTI.

FIG. 2 shows an example of the operation of the HSDPA technique over a series of transmission time intervals TTI1 to TTI9. As shown in FIG. 2, in TTI1 it is determined that two packets will be sent to UE50, four packets will be sent to UE11 and four packets will be sent to UE2. Accordingly, two channels are allocated to UE50 and four channels each are allocated to UE11 and UE2. Thus, as shown in FIG. 1, UE50 is allocated channels C1 and C2, UE11 is allocated channels C3 to C6, and UE2 is allocated channels C7 to C10.

In the next transmission time interval TTI2 a new user equipment UE1 is sent one packet, and the remaining UEs specified in TTI1 continue to receive packets.

Thus, effectively the HSDPA system employs a number of parallel shared channels to transmit data in packet form from the base station to the different UEs. This system is expected to be used, for example, to support world wide web (WWW) browsing.

In the HSDPA system, channel state information (CSI) is made available to both the transmitter and the receiver, in order to realise a robust communication system structure. The HSDPA system is intended to increase the transmission rates and throughput, and to enhance the quality of service (QoS) experienced by different users. It transfers most of the functions from the base station controller (also known as the radio network controller or RNC) to the base transceiver station (node B).

The HSDPA system may also use a control technique referred to as an adaptive modulation and coding scheme (AMCS) to enable the base station to select different modulation and/or coding schemes under different channel conditions.

The signal transmission quality for a channel between the transmitter and a receiver (UE) varies significantly over time. FIG. 3 shows an example of the variation of a signal-to-interference ratio (SIR) a downlink channel for four different users over a series of 5000 TTIs. This plot was obtained by a simulation. As illustrated, for a given UE the range of SIR values may be as much as from around +12 dB to −15 dB. The SIR value varies due to shadowing, Rayleigh fading, and change in distribution of the mobile UEs, as well as cellular area specifications including the propagation parameters and speeds of UEs.

FIG. 4 is a graph illustrating a relationship between a data transmission rate (throughput) and signal-to-interference ratio for four different modulation and coding combinations, also referred to as modulation-and-coding scheme (MCS) levels. The first three levels (MCS8, MCS6 and MCS5) are all quadrature amplitude modulation (QAM) schemes which differ from one another in the number (64 or 16) of constellation points used. The fourth level (MCS1) uses quadrature phase shift keying (QPSK) as its modulation scheme.

Each level uses coding defined by a coding parameter which, in this example, is expressed as a redundancy rate R. For the first two levels MCS8 and MCS6 the redundancy rate R is ¾, and for the third and fourth levels MCS5 and MCS1 the redundancy rate is ½.

As can be seen from FIG. 4, for SIR values lower than around −4 dB MCS1 (QPSK, R=½) is the best available option. The characteristic of this level is plotted with circles in the figure.

For SIR values in the range from around −4 dB to around +2 dB, MCS5 (16 QAM, R=½) provides the best transmission rate. The characteristic for this MCS level is illustrated by crosses in the figure.

For SIR values between around +2 dB and +8 dB MCS6 (16 QAM, R=¾) provides the best transmission rate. The characteristic for this MCS level is illustrated by diamond points in the figure.

Finally, for SIR values greater than around +8 dB, MCS8 (64 QAM, R=¾) provides the best transmission rate. The characteristic of this combination is illustrated by square points in the figure.

In the HSDPA system a technique such as adaptive modulation and coding (AMC) is used to adapt the MCS level in accordance with the variations of the channel condition (e.g. SIR value). Each UE produces a measure of the SIR of a downlink channel from the base station, and reports this measure (SIR value) to the base station. The base station then employs the reported SIR values for each UE, as well as information relating to the system limitations and available MCS levels, to identify the most efficient MCS level for the particular UE. Thus, UEs that have better channels or are located in the vicinity of the base station can employ higher levels of MCS and therefore enjoy higher transmission rates. The selection can be carried out, for example, by imposing thresholds (e.g. Th01, Th02 and Th03, as shown in FIG. 4) for moving to the next MCS level. Effectively, the result is a classification of the transmission rates based on the channel quality of each UE.

Ideally, each UE reports a SIR value in every TTI and the base station is capable of setting a new MCS level for each available channel in every TTI.

The HSDPA system may also employ a hybrid automatic repeat request (H-ARQ) technique.

FIG. 5 is a schematic diagram for use in explaining how the H-ARQ technique works. In this example, the technique is a so-called stop-and-wait (SAW) version of the technique. The figure shows packet transmissions in a single downlink channel HSPDSCH1 over a series of successive TTIs, TTI1 to TTI9. In TTI2 a first packet is transmitted to UE1. Upon receiving a packet, each UE checks whether the transmission was error-free. If so, the UE sends an acknowledge message ACK back to the base station using an uplink control channel such as the dedicated physical control channel (DPCCH). If there was an error in the transmission of the received packet, the UE sends a non-acknowledge message NACK back to the base station using the uplink channel.

In the example shown in FIG. 5, the first packet transmitted to UE1 in TTI2 fails to be received error-free, and accordingly some time later, in TTI4, UE1 sends the NACK message to the base station. In the H-ARQ technique it is permitted for the next packet destined for a particular UE to be transmitted without waiting for the acknowledge or non-acknowledge message of a packet previously transmitted to the same UE. Thus, none of the transmission timeslots can go idle in the case of error-free channels, which gives the ability to schedule UEs freely. System capacity is saved while the overall performance of the system in terms of delivered data is improved.

For example, as shown in FIG. 5, before the NACK message for the first packet of UE1 is received by the base station, the base station transmits a second packet to UE1 in TTI4. Thus, this second packet for UE1 is transmitted before the first packet for UE1 is retransmitted in TTI7 in response to the NACK message for the first transmission of the first packet.

In the H-ARQ technique, an erroneously-received packet (failed packet) is subject to a so-called chase combining process. In this process a failed packet is resent by the transmitter and subsequently the receiver "soft" combines (for example using maximal ratio combining) all received copies of the same packet. The final SIR is determined as the sum of the respective SIRs of the two packets being combined. Thus, the chase combining process improves the SIR of the transmitted packets.

Further information regarding AMC and HARQ techniques may be found in 3 GPP TR 25.848 V 4.0.0 (2001-03), Third Generation Partnership Project; Technical Specification Group Radio Access Network; Physical Layer Aspects of UTRA High Speed Downlink Packet Access (release 4), March 2001, the entire content of which is incorporated herein by reference.

The switching between different MCS levels has been recognised as a very critical task, and recently there have been various proposals for optimising this switching. For example, in TSG R1-1-0589, TSG-RAN Working Group 1 meeting no. 20, Busan, Korea, May 21 to 25, 2001, NEC and Telecom MODUS jointly proposed an AMCS technique in which the thresholds for switching between different MCS levels are adjusted based on the ACK/NACK signalling from the UE. If NACK is signalled, the base station increases the thresholds by an upward amount S1. If ACK is signalled, the base station decreases the thresholds by a downward amount S2. The adjustments to the thresholds are limited and, for simplicity, the differences between thresholds may be fixed. The ratio between the upward amount S1 and the downward amount S2 may be determined based on the target error rate.

This AMCS method adjusts the thresholds between MCS levels to try to take into account different operating conditions in the wireless communication system. In particular, the optimum MCS levels under any particular signal conditions depend on the Doppler frequency (i.e. the speed at which the UE is moving) and the multi-path propagation conditions. For example, FIG. 6 shows the effect of the UE speed on the throughput-vs.-SIR characteristic for each of the different MCS levels in FIG. 4. Three lines are plotted per MCS level: the highest line corresponds to a low UE speed of 3 km/h (Doppler frequency Fd=5.555 Hz), the middle line corresponds to a medium UE speed of 60 km/h (Fd=111.112 Hz), and the lowest line corresponds to a high UE speed of 120 km/h (Fd=222.24 Hz). FIG. 6 shows that throughput declines as UE speed increases. It can also be seen that the optimum thresholds for switching between MCS levels are also changed as the UE speed changes.

FIG. 6 relates to a single-path Rayleigh fading mode. FIG. 7 shows the effect of different UE speeds under path conditions of two equal-gain paths. It can be seen that the characteristics are very different from FIG. 6, and it is clear that the optimum thresholds are changed as the path conditions change.

The method proposed by NEC/Telecom MODUS changes the thresholds as the operating conditions change but the method does not provide a satisfactory solution as it increases or decreases the threshold each time an ACK or NACK message is received, i.e. every frame. This appears to result in relatively poor performance at lower MCS levels for path conditions in which there is effectively a single dominant path, for example in open countryside.

BRIEF SUMMARY OF THE INVENTION

According to a first aspect of the present invention there is provided an adaptive modulation and coding method. The method comprises selecting one of a plurality of different available modulation and coding levels to apply to a signal transmitted from a transmitter to a receiver. The selection is based on a comparison between a signal transmission quality and a threshold value. The method also comprises adjusting the threshold value when the signal transmission quality is within a predetermined range of the threshold value, and maintaining the threshold value unchanged when the signal transmission quality is outside that range.

In such an AMCS method the threshold values are adjusted to take account of the prevailing signal transmission conditions but to a more limited extent than in previous proposals. This leads to improved throughput performance, especially under path conditions involving a single dominant path. The signal transmission quality may be a signal-to-interference ratio, and may be measured by the receiver. The signal transmission quality may be measured based on the actual signal to which AMCS is being applied or on another signal, such as a pilot signal.

In the adjusting step the threshold value may be increased by an upward amount when the signal is not received successfully by the receiver, and may be decreased by a downward amount when the signal is received successfully by the receiver. In most communication systems the receiver is required to monitor whether the signal is received successfully, so using this information to help adjust the threshold value does not require any new information to be generated.

For example, in a system in which a cyclic redundancy check (CRC) is carried out on the received signal by the receiver in the adjusting step the threshold value may be increased by an upward amount when the received signal fails the cyclic redundancy check, and may be decreased by a downward amount when the received signal passes the cyclic redundancy check. Again, in such a system in which this information is already being generated, the AMCS method can use this information for the purpose of adjusting the threshold value without increasing the information-generating burden on the system.

The upward amount may be different from the downward amount. In a correctly-operating system, preferably the downward amount is smaller than the upward amount. In a correctly-operating system, the received signal should be received successfully (e.g. pass the CRC) more frequently than it is received unsuccessfully (e.g. fail the CRC). Accordingly, to achieve stable adjustment or stability in the system, the downward amount, which is expected to be applied more often than the upward amount, should be smaller than the upward amount. If the signal transmission conditions are expected to be poor, on the other hand, the downward amount could be set higher than the upward amount.

For example, a ratio of the downward amount to the upward amount may be dependent upon a target error rate of the received signal. This target error rate is a measure of the expected success in receiving the signal. In one embodiment, the ratio of the downward amount to the upward amount is made equal to the ratio of the number of times the signal is received unsuccessfully to the number of times the signal is received successfully, i.e. the target error rate divided by 1 minus that error rate. In this way, the lower the target error rate the lower the ratio between the downward amount and the upward amount.

In one embodiment the downward amount and/or the upward amount is/are dependent upon a difference between the threshold value and the signal transmission quality. For example, the or each amount increases as the difference decreases. This has the effect of magnifying the adjustment amounts near to the threshold value, whilst limiting any adjustments further away from the threshold value.

In a practical system there may be more than two different available levels, in which case there is a threshold value for each pair of adjacent levels. In this case, preferably, each the threshold value is adjusted only when the signal transmission quality is within a predetermined range of the threshold value concerned.

In this case, the predetermined range for at least one threshold value may be different from the predetermined range for another the threshold value. This may be desirable as different levels have quite different characteristics, at least under some channel conditions. Having the ability to set different predetermined ranges for different thresholds can enable these differences to be taken into account.

The predetermined range may be set by a single value $\alpha$ so that it extends from the threshold value minus $\alpha$ to the threshold value plus $\alpha$. Alternatively, the range may be set by two different values $\alpha_1$ and $\alpha_2$ so that it extends from the threshold value minus $\alpha_1$ to the threshold value plus $\alpha_2$. Again, having the ability to set different values $\alpha_1$ and $\alpha_2$ for the predetermined range can enable the different characteristics of MCS levels to be taken into account.

In one embodiment the adjusting step and the selecting step are carried out in the receiver, and the receiver reports the selected level to the transmitter.

In another embodiment the receiver reports the signal transmission quality to the transmitter, and the adjusting step and selecting step are carried out in the transmitter.

The selecting step may be carried out after the adjusting step so that the selection is based on the threshold values after any adjustments have been applied. Alternatively, the selecting step may be carried out before the adjusting step.

In the selecting step, it may also be desirable to make the selection dependent on whether or not the signal was received successfully. For example, if the signal was not received successfully, a move to a higher level may be prevented, even if the signal transmission quality is now greater than the adjusted threshold value.

The method may be used in any communication system having a transmitter and a receiver in which an AMCS method is applicable. In particular the method may be used in a cellular wireless communication system, in which case the transmitter may be a base station of the wireless communication system, and the receiver may be a user equipment of the system.

The method is particularly useful in an HSDPA system, in which case the signal to which AMCS is applied is a downlink packet access signal.

According to a second aspect of the present invention there is provided adaptive modulation and coding apparatus. The apparatus comprises a level selecting unit which selects one of a plurality of different available modulation and coding levels to apply to a signal transmitted from a transmitter to a receiver. The selection is based upon a comparison between a signal transmission quality and a threshold value. The apparatus also comprises a threshold value adjusting unit operable, when the signal transmission quality is within a predetermined range of the threshold value, to adjust the threshold value, and also operable when the signal transmission quality is outside that range, to maintain the threshold value unchanged.

According to a third aspect of the present invention there is provided a user equipment, for use in a wireless communication system. The user equipment comprises a level selecting unit which selects one of a plurality of different available modulation and coding levels to be applied by a base station of the system to a downlink signal transmitted from the base station to the user equipment. The selection is based on a comparison between a signal transmission quality and a threshold value. The user equipment also comprises a threshold value adjusting unit operable, when the signal transmission quality is within a predetermined range of the threshold value, to adjust the threshold value, and also operable, when the signal transmission quality is outside that range, to maintain the threshold value unchanged. A reporting unit reports the selected level to the base station.

According to a fourth aspect of the present invention there is provided a base station for use in a wireless communication system. The base station comprises a report receiving unit which receives from a user equipment of the system a report of a downlink signal transmission quality produced by the user equipment. A level selecting unit selects one of a plurality of different available modulation and coding levels to apply to a downlink signal transmitted from the base station to the user equipment. The selection is based upon a comparison between the reported downlink signal transmission quality and a threshold value. A threshold value adjusting unit is operable, when the signal transmission quality is within a predetermined range of the threshold value, to adjust the threshold value, and also operable, when the signal transmission quality is outside that range, to maintain the threshold value unchanged.

In practice an AMCS method embodying the invention is likely to be implemented at least in part by a processor in the user equipment or in the base station which runs an operating program. Thus, according to a fifth aspect of the present invention there is provided an operating program which, when run on a processor in a user equipment of a wireless communication system, causes the user equipment to carry out certain steps of the method. One step is to select one of a plurality of different available modulation and coding levels to be applied by a base station of the system to a downlink signal transmitted from the base station to the user equipment. The selection is based on a comparison between a signal transmission quality and a threshold value. In another step, when the signal transmission quality is within a predetermined range of the threshold value, the threshold value is adjusted, and, when the signal transmission quality is outside that range, the threshold value is maintained unchanged. In another step the selected level is reported to the base station.

Similarly, according to a sixth aspect of the present invention there is provided an operating program which, when run on a processor in a base station of a wireless communication system, causes the base station to carry out certain steps. One step is receiving from a user equipment of the system a report of a downlink signal transmission quality produced by the user equipment. Another step is selecting one of a plurality of different available modulation and coding levels to be applied by the base station to a downlink signal transmitted from the base station to the user equipment. The selection is based on a comparison between the reported downlink signal transmission quality and a threshold value. In another step when the signal transmission quality is within a predetermined range of the threshold value, the threshold value is adjusted, and when the signal transmission quality is outside that range, the threshold value is maintained unchanged.

Further aspects of the present invention can provide control circuitry for use in a user equipment or base station which control circuitry carries out the steps of the fifth and sixth aspects.

BRIEF DESCRIPTION OF THE DRAWINGS

FIG. 17 presents a table giving detailed parameters of different MCS levels.

DETAILED DESCRIPTION OF THE PREFERRED EMBODIMENTS

Figure 8:
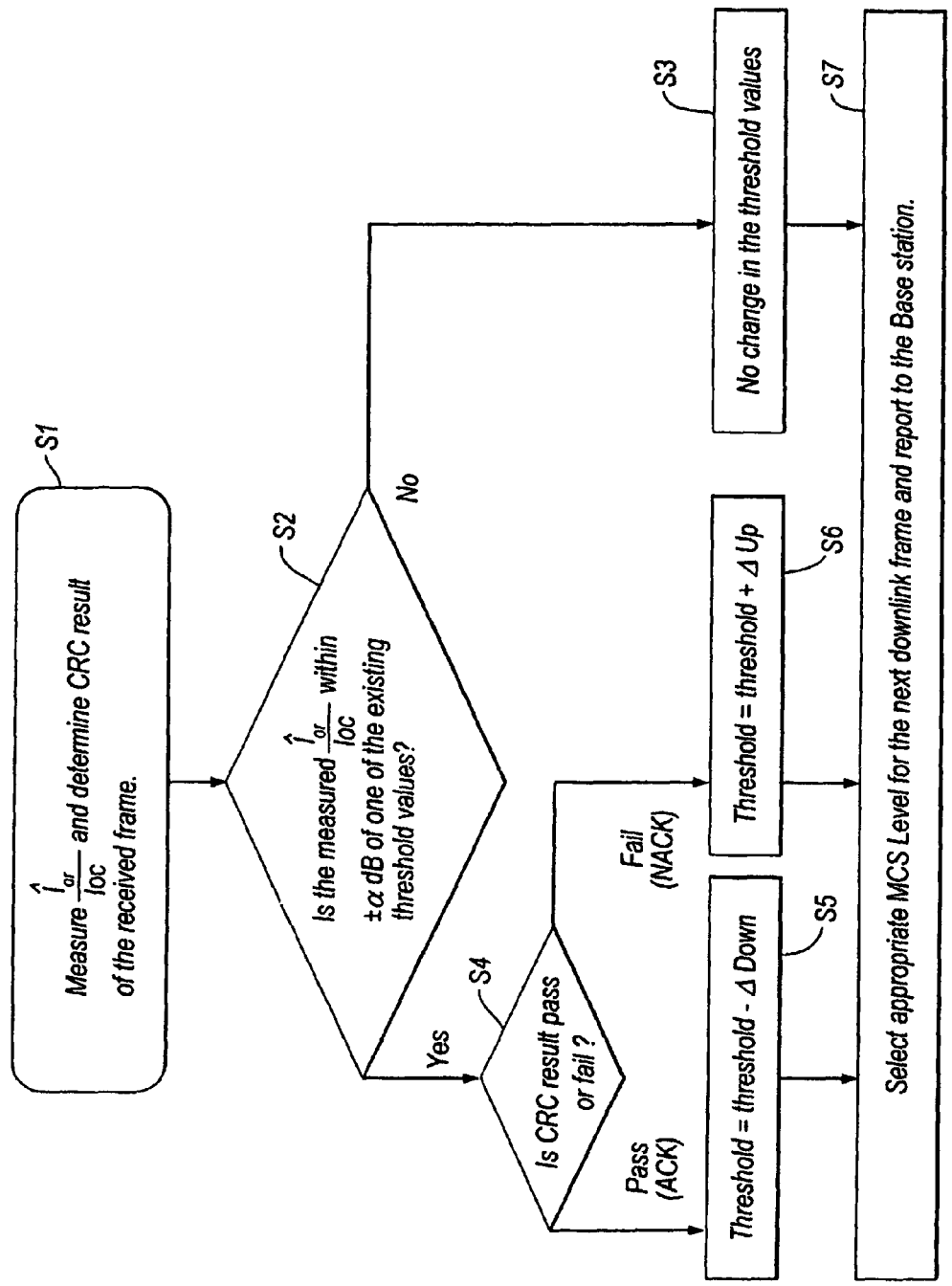
FIG. 8 is a flowchart for use in explaining an AMCS method according to a first embodiment of the present invention.

FIG. 8 is a flowchart for use in explaining an AMCS method according to a first embodiment of the present invention. In this embodiment, the UE selects the appropriate MCS level for each frame of the downlink signal and reports the selected level to the base station.

In this example, the method is used to adapt the MCS level of a downlink packet access signal in an HSDPA system.

Figure 9:
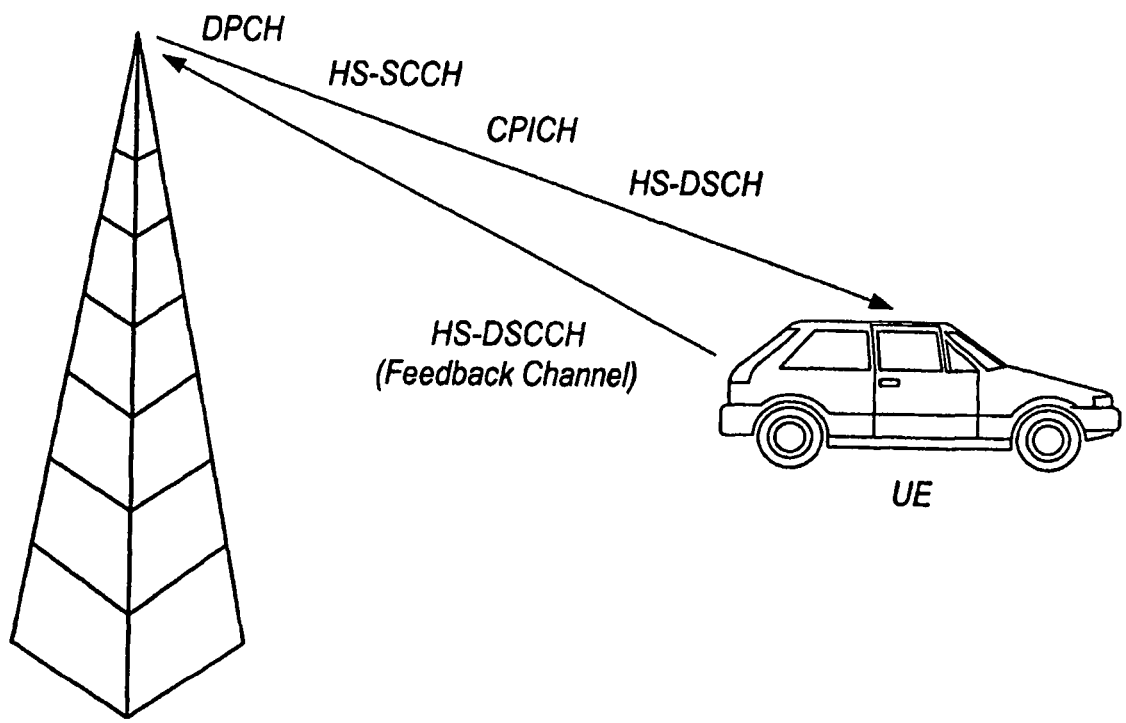
FIG. 9 is a schematic view of parts of a wireless communication system for explaining signalling used therein.

FIG. 9 is a schematic view for explaining signalling in the first embodiment.

For downlink signalling, four channels are used. A common pilot channel (CPICH) is used to broadcast a signal to all UEs in the cell served by the base station, in order to enable each UE to measure a downlink channel quality based on the CPICH signal. A high-speed downlink shared channel HS-DSCH is used to transmit packet data to a UE. A high-speed shared control channel HS-SCCH is used to carry transport format and resource related information (TFIR). This TFIR is, for example, 8 bits and includes information regarding a channelisation code, a MCS level, and a transport block size. The HS-SCCH also carries HARQ related information. This HARQ information is, for example, 12 bits and includes a HARQ process number, a redundancy version, a new data indicator, and a UE ID. A dedicated physical channel DPCH is optionally employed to transmit a high-speed data control signal for indicating whether or not the high-speed packet mode is in use.

Uplink signalling is carried out using a high-speed dedicated physical control channel HS-DPCCH. This channel is used to transmit a channel quality indicator, an HARQ acknowledgement (ACK/NACK) and, in the present embodiment, a MCS level selected by the UE.

Referring back to FIG. 8, the AMCS method according to the first embodiment operates on a frame-by-frame basis. In each downlink frame (TTI) the method involves the steps S1 to S7.

In step S1, the UE produces a measure of downlink channel quality. This measure is, for example, based on the CPICH and represents a ratio of a received power $\hat{I}_{or}$ of the CPICH signal to background noise including interference $I_{oc}$. The ratio $\hat{I}_{or}/I_{oc}$ is a signal-to-interference ratio.

Also in step S1 the UE carries out a cyclic redundancy check (CRC) on the current frame of the HS-DSCH signal. The CRC result (pass or fail) is needed to generate the ACK/NACK message but, as described below, is also used for another purpose in the present embodiment.

Figure 1:
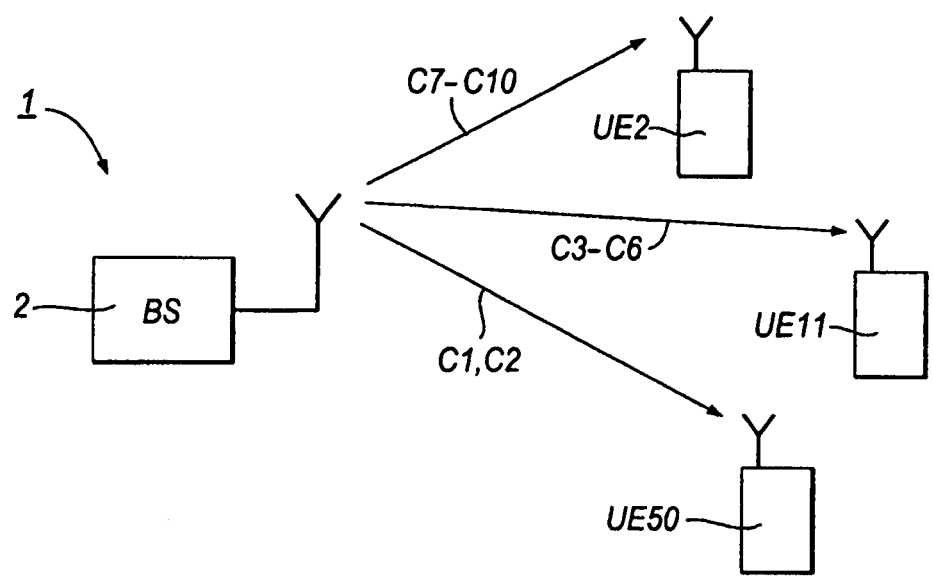
FIG. 1, discussed hereinbefore, shows parts of a wireless communication system employing a HSDPA technique for downlink transmissions.
Figure 2:
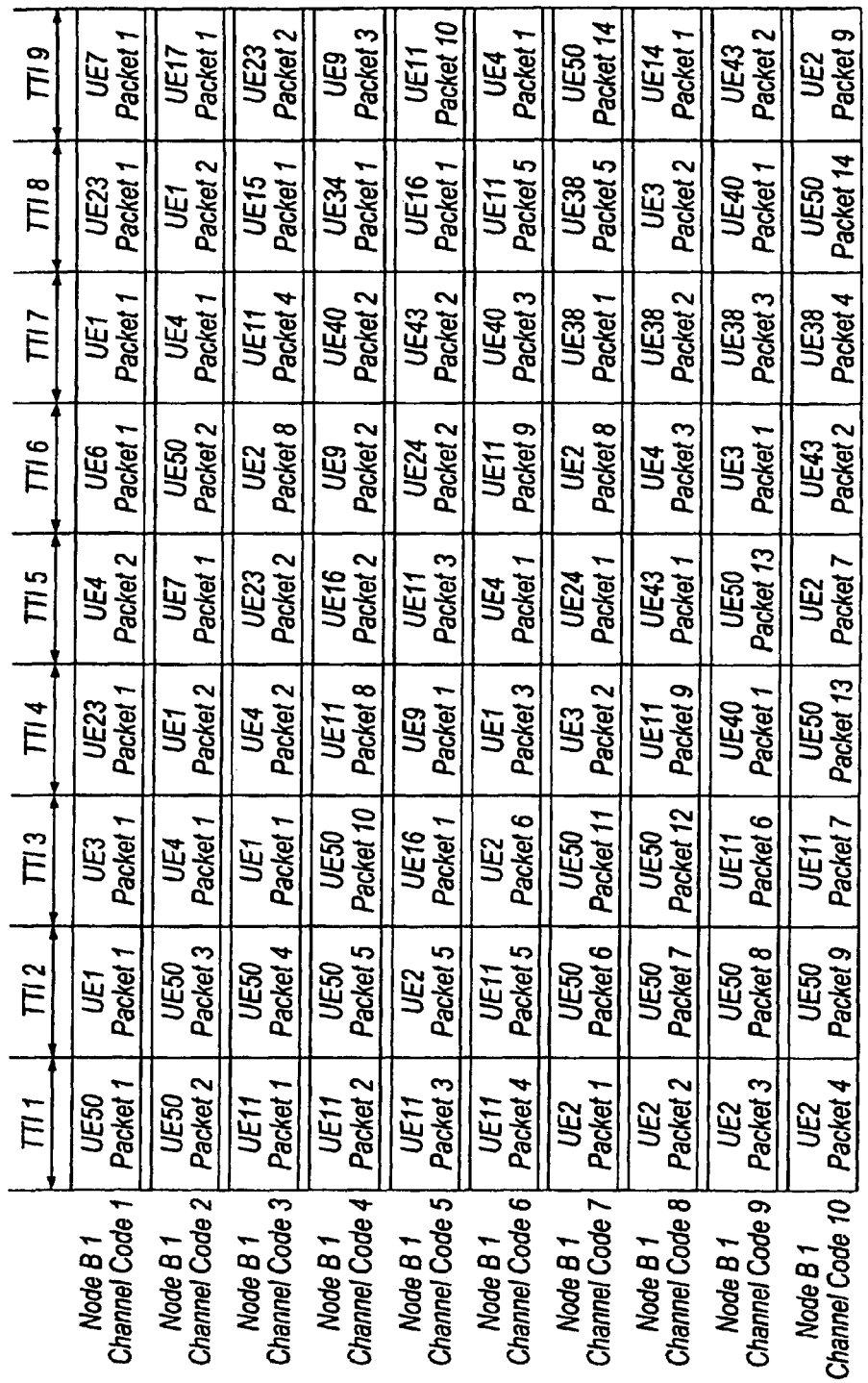
FIG. 2 shows an example of the operation of the HSDPA technique in the FIG. 1 system.
Figure 3:
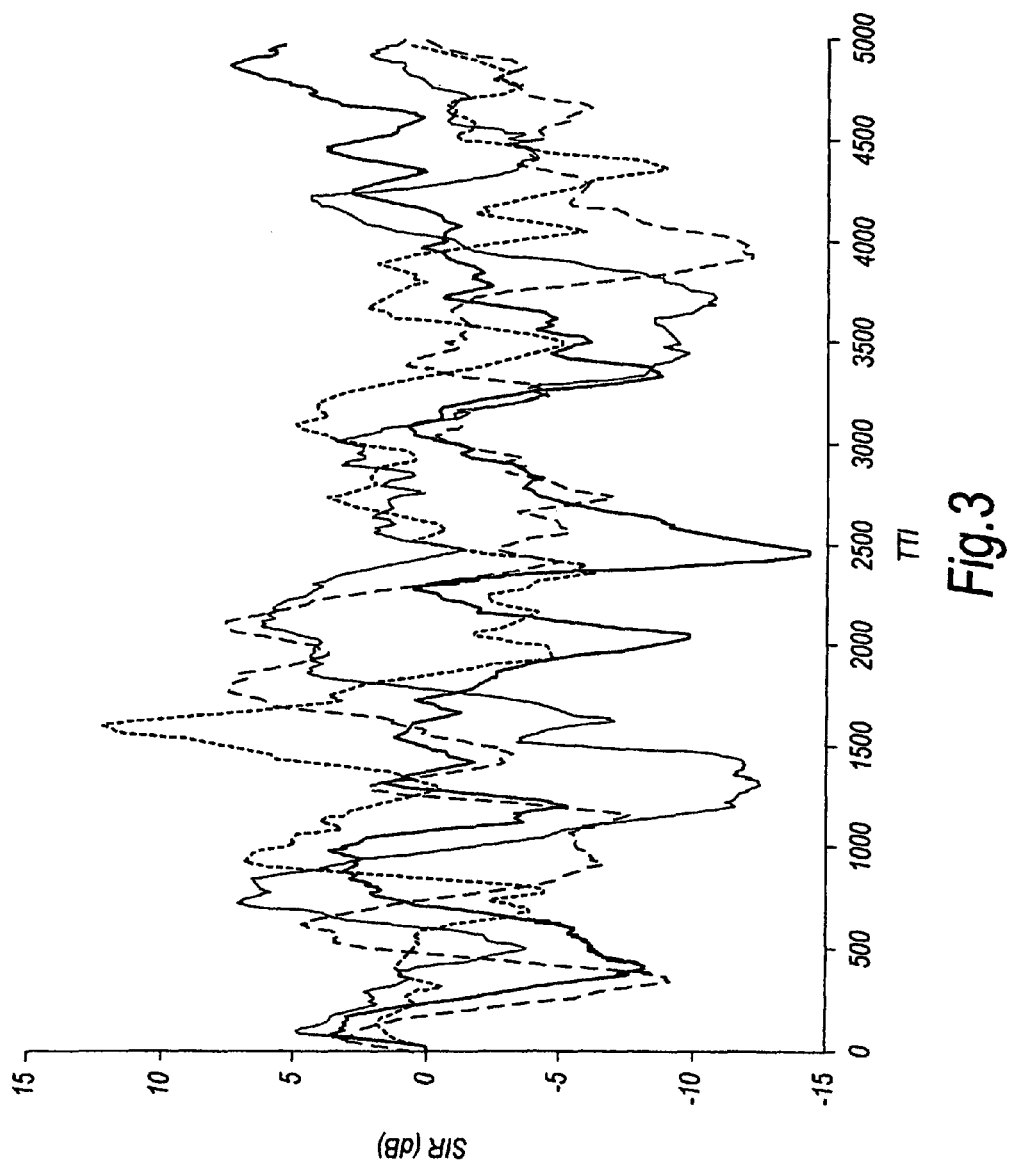
FIG. 3 is a graph illustrating an example variation in signal-to-interference ratio of a downlink channel over a series of transmission time intervals for four different UEs in a wireless communication system.
Figure 4:
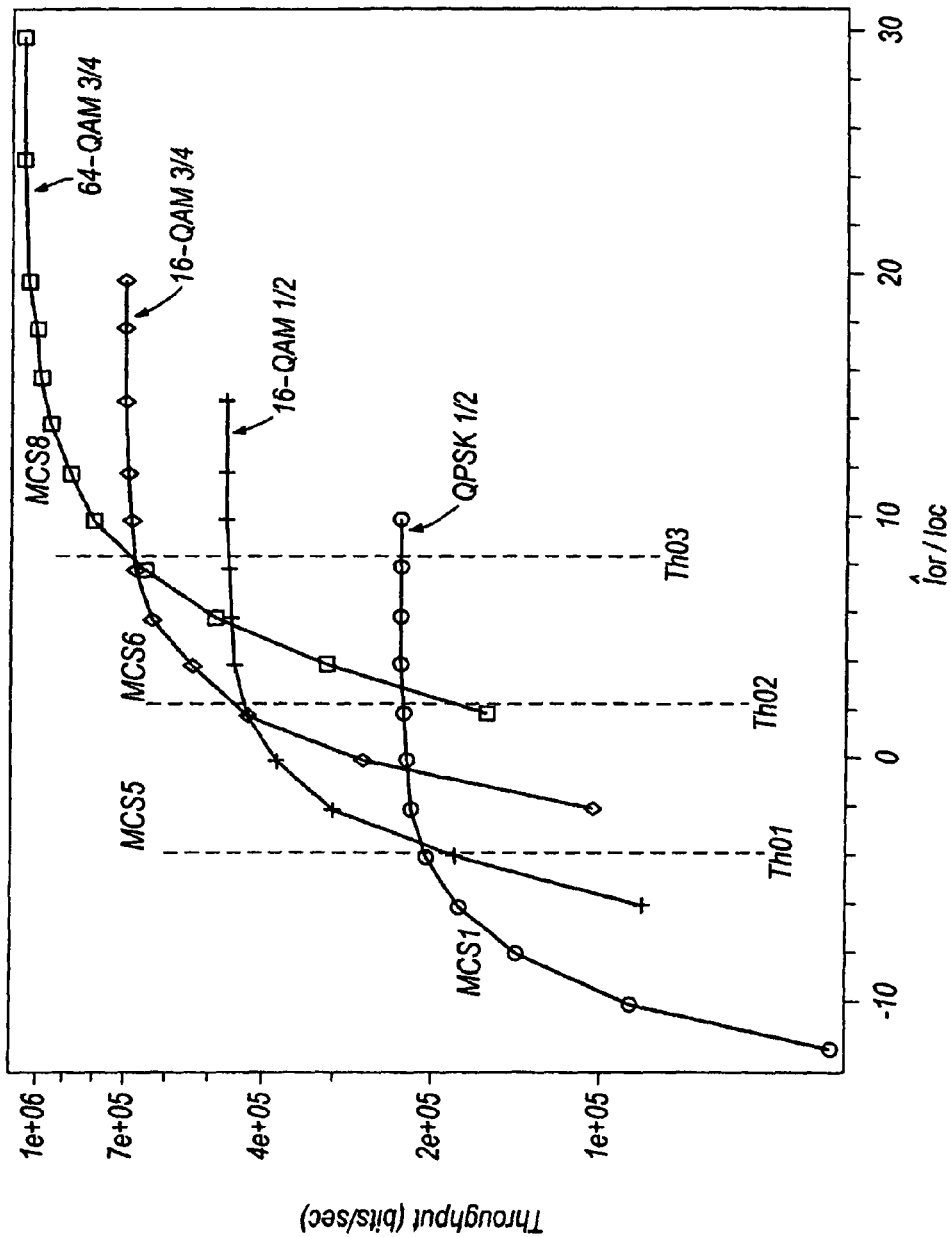
FIG. 4 is a graph for use in explaining an adaptive modulation and coding technique.
Figure 5:
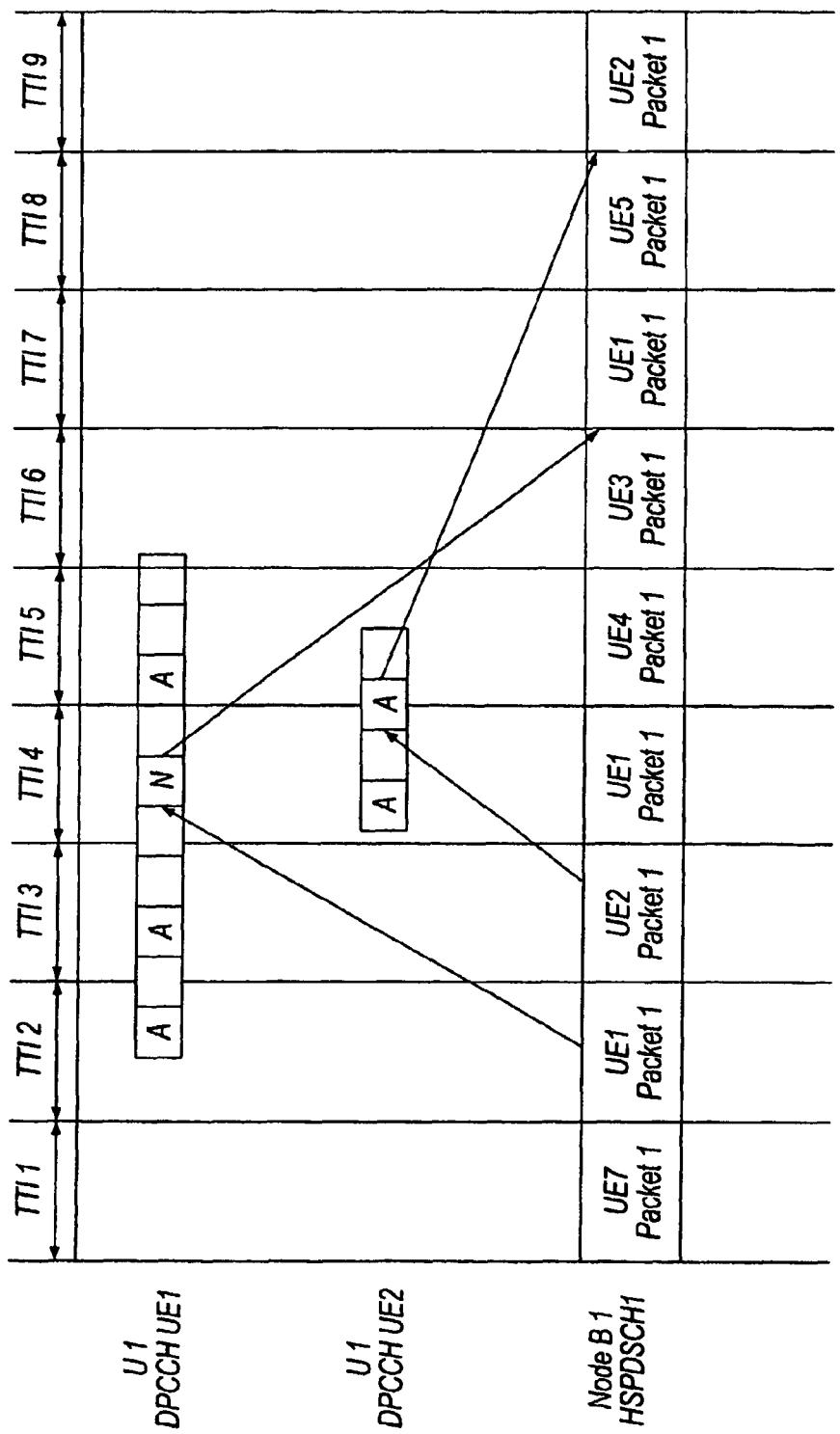
FIG. 5 is a schematic diagram for use in explaining an automatic repeat request process.

In step S2 the measure of downlink channel quality produced in step S1 is compared with a set of threshold values held by the UE for MCS selection purposes. There is one such threshold value for each pair of adjacent MCS levels. These threshold values correspond to the threshold values Th01, Th02 and Th03 described with reference to FIG. 4 above. Based on the comparison, it is determined whether or not the measure of downlink channel quality is within a predetermined range ±αdB of one of the threshold values. As described later in more detail, α may be different for different threshold values in the set. Also, for each threshold value there may be two α-values, $\alpha_1$ and $\alpha_2$, and the downlink channel quality measure is considered to be within the predetermined range if it is greater than the threshold value less $\alpha_1$ and less than the threshold value plus $\alpha_2$.

If the downlink channel quality measure is outside the predetermined range of each of the threshold values, it is determined in step S3 that no change to any of the threshold values is required, and processing proceeds to step S7. In step S7, the downlink channel quality measure is compared with the different threshold values and the appropriate MCS level is selected based on the comparison. Thus, in the example of FIG. 4, if the downlink channel quality measure is greater than the threshold value Th03, MCS8 is selected; if the measure is between the threshold values Th02 and Th03 MCS6 is selected; if the measure is between the threshold values Th01 and Th02, MCS5 is selected, and if the measure is less than the threshold value Th01, MCS1 is selected. The selected MCS level is reported to the base station using the HS-DPCCH.

If in step S2 the downlink channel quality measure is found to be within the predetermined range of one of the threshold values of the set, processing proceeds to step S4. In step S4 it is determined whether the CRC result in step S1 was a pass or fail. If the result was a pass, i.e. the ACK message was sent from the UE back to the base station, the threshold value that has found to be within the predetermined range is decreased by a downward amount ΔDown in step S5. If, on the other hand, the CRC result was a fail, i.e. the NACK message was sent by the UE back to the base station, the threshold value found to be within the predetermined range is increased by an upward amount ΔUp in step S6.

In steps S5 and S6 only the threshold value found to be within the predetermined range of the downlink channel quality message is changed. Each of the remaining threshold values is left unchanged.

The upward and downward amounts ΔUp and ΔDown are discussed in detail below.

After step S5 or step S6, processing proceeds to step S7 to select the appropriate MCS level for the next downlink frame. In this case, therefore, the selection is made based on the updated set of threshold values.

Thus, in the first embodiment the threshold values are adjusted according to whether the downlink signal was received successfully by the UE or not (steps S4 to S6) as in the previous joint proposal of NEC and MODUS Telecom described in the introduction. However, whereas that previous proposal changed the threshold values every frame irrespective of downlink channel quality, the present embodiment only adjusts a threshold value if the downlink channel quality measure is within a predetermined range of that value. Otherwise, no change is made to the threshold values (step S3). This has the effect of limiting the changes to the threshold values in use of the method. Surprisingly, it is found that this simple measure provides a significant improvement in performance of the AMCS method, as will now be explained with reference to FIGS. 10 to 13.

Figure 10:
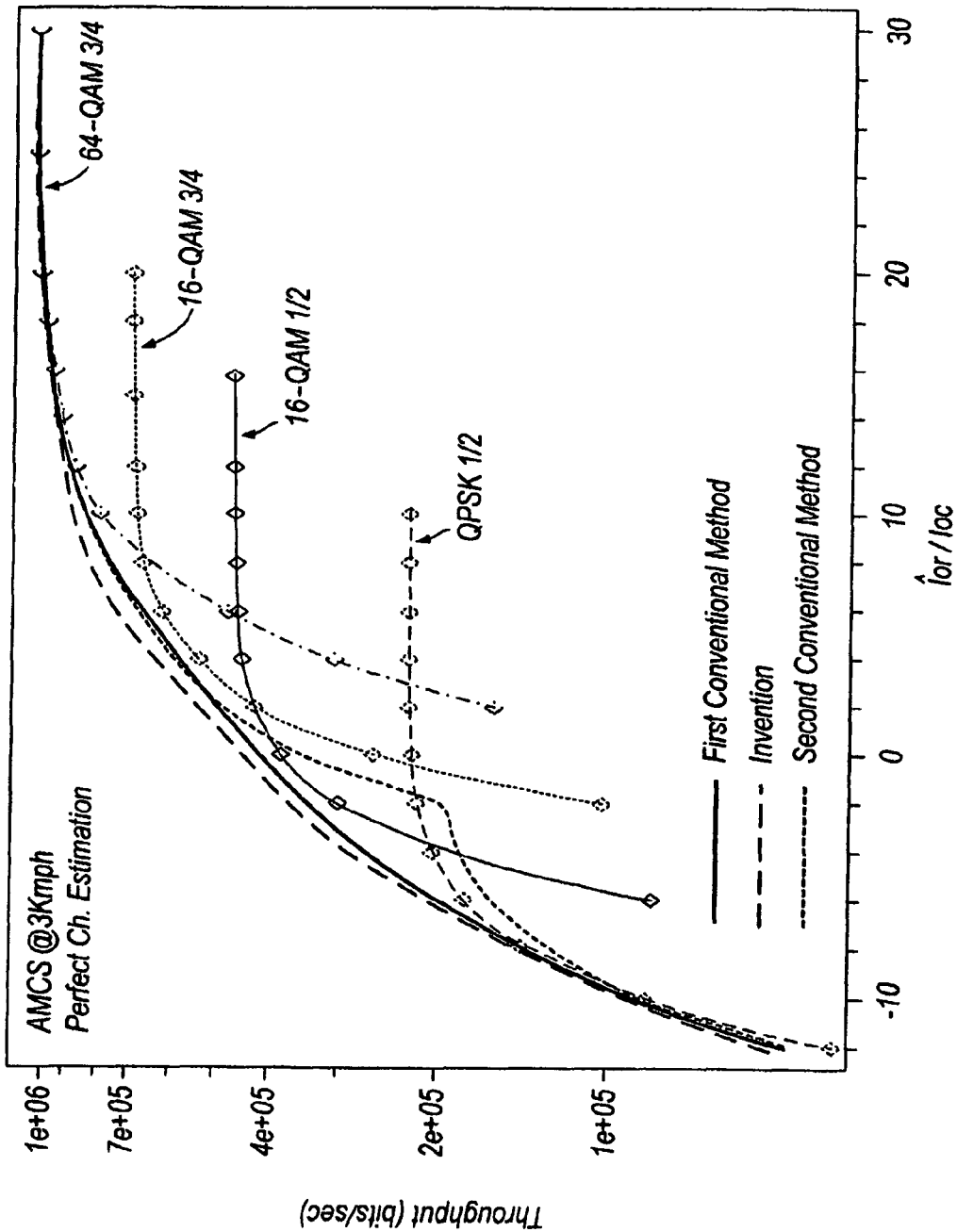
FIGS. 10 to 13 are graphs for comparing operation of an AMC method embodying the present invention with conventional methods under different UE speed and path conditions.

FIG. 10 shows a throughput versus downlink channel quality characteristic for a first conventional AMCS method having fixed threshold values (solid line), a second conventional AMCS method according to the joint NEC/MODUS Telecom proposal having adjustable threshold values (dotted line), and an AMCS method embodying the present invention (dashed line). FIG. 10 assumes that the UE is moving at a low speed of 3 kph and that the channel estimation carried out by the UE is perfect.

Further it is assumed that the path conditions prevailing between the base station and the UE are such that there is a single dominant path. This kind of path condition arises, for example, in open countryside, as opposed to urban environments. As is evident from FIG. 10, an AMCS method embodying the present invention provides a significant improvement in performance over both conventional methods, over a very wide range of downlink channel qualities (e.g. from −6 dB to +16 dB). By contrast, the second conventional method has a significant dip in performance under the single path condition for downlink channel qualities in the range from about −10 dB to +4 dB. This dip is thought to arise from a bunching of the threshold values under the single dominant path condition.

Figure 11:
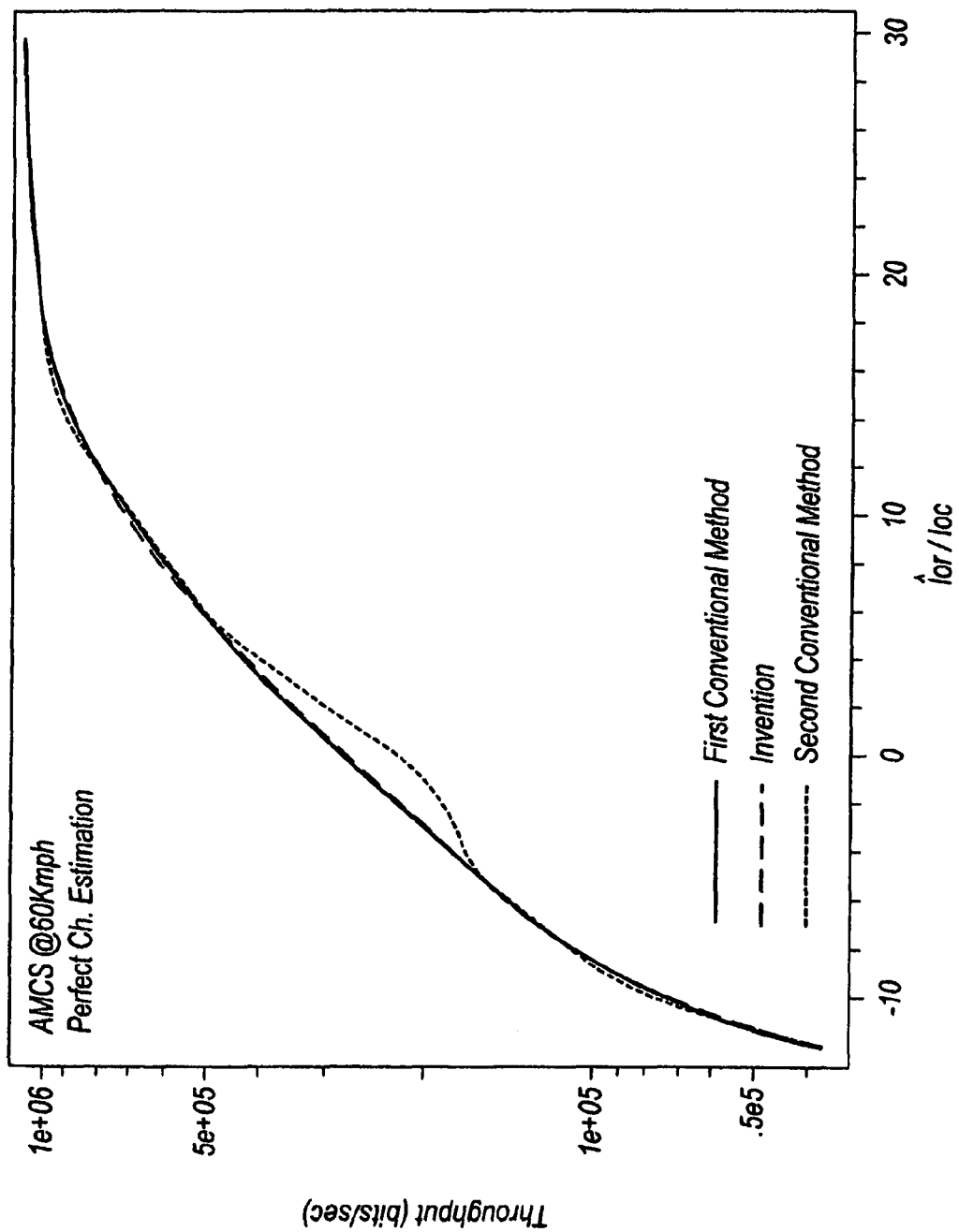

FIG. 11 shows the corresponding results for the three methods, again under single path conditions, but with the UE moving at a medium speed of 60 kph. In this case, also, it is evident that the AMCS method embodying the present invention avoids the undesirable dip in the second conventional method.

Figure 12:
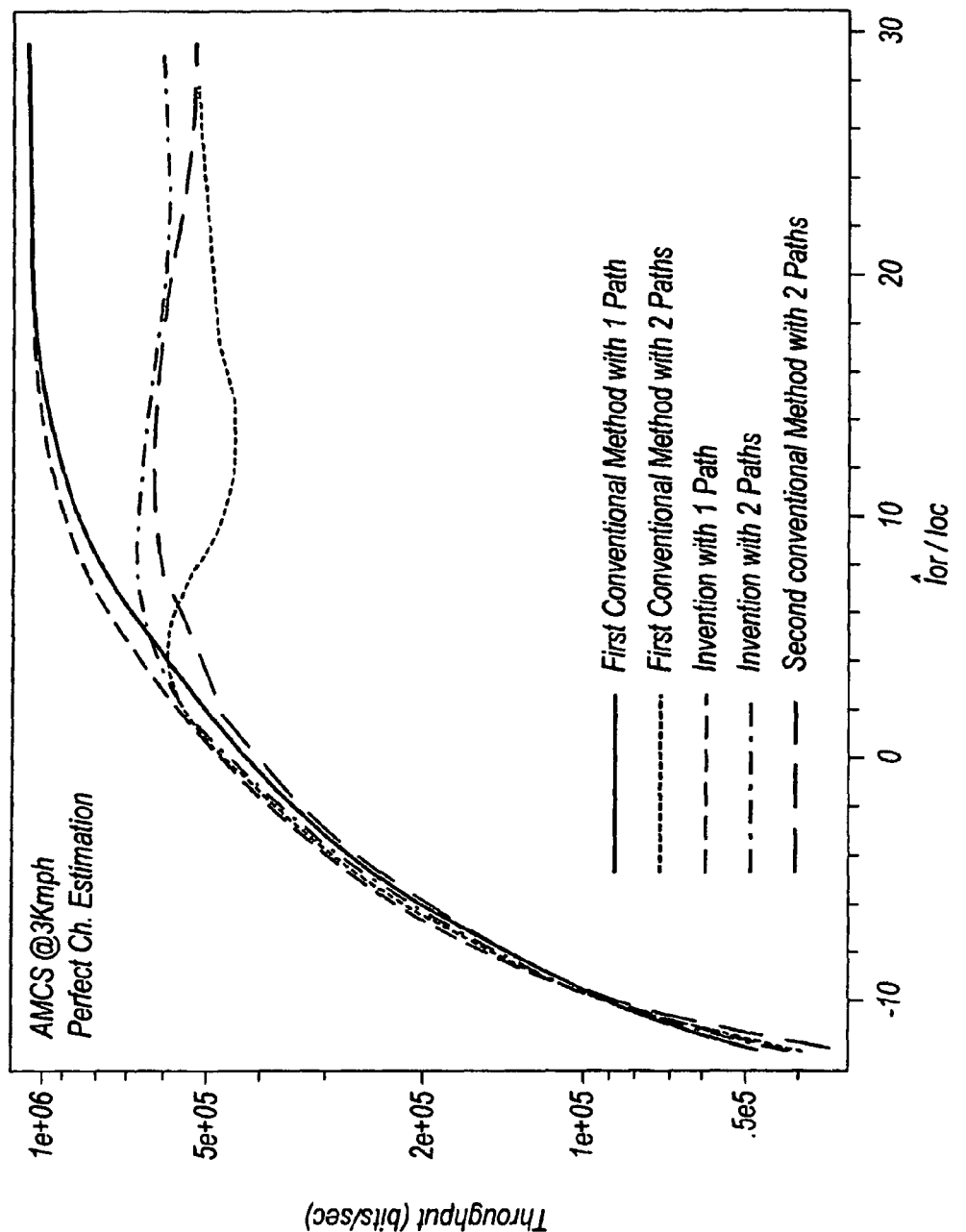

FIG. 12 shows some results obtained under two-equal-gain path conditions for the three different methods, and also shows (for comparison purposes) the performance of the first conventional method and a method embodying the present invention for single-path conditions. In FIG. 12, the UE is assumed to be moving at 3 kph as in FIG. 10.

It can be seen that under two-equal-gain path conditions, a method embodying the present invention outperforms the two conventional methods, as well.

Figure 13:
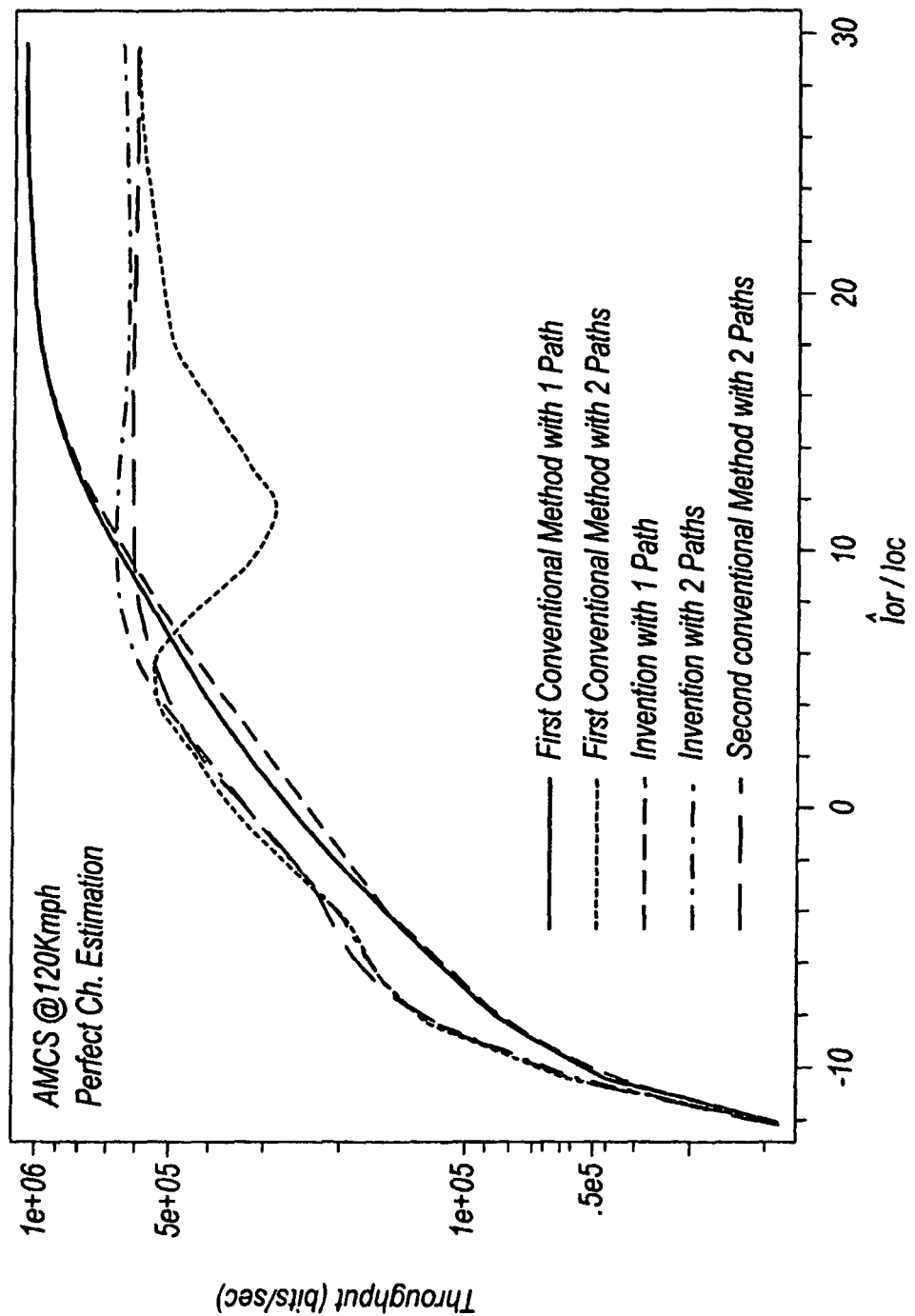

Finally, FIG. 13 shows results corresponding to FIG. 12 but for a UE moving at a very high speed of 120 kph. Under these conditions as well, a method embodying the present invention outperforms both the conventional methods, in particular the first conventional method (fixed thresholds) which has a significant performance dip for downlink channel qualities between +4 and +24 dB.

Next, a possible modification of the first embodiment will be described with reference to FIG. 14. This modification relates to the operations carried out in step S7 in FIG. 8. In this modification, as well as making the selection of the MCS level for the next downlink frame based on the updated set of threshold values, the UE also takes account of the CRC result in deciding the MCS level.

Figure 14:
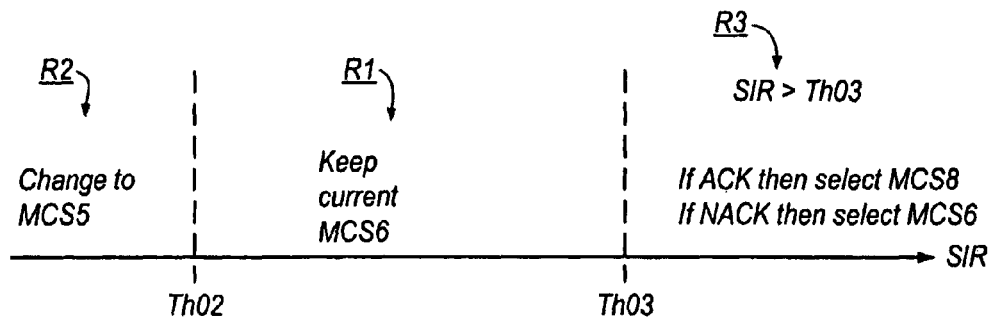
FIG. 14 is a schematic diagram for use in explaining a modification to the FIG. 8 method.

FIG. 14 shows the threshold value Th02 used for selecting between MCS5 and MCS6, and the threshold value Th03 used for selecting between MCS6 and MCS8. Assume that the threshold values have been adjusted as necessary in step S5 or S6 or maintained unchanged in step S3 and that the current MCS level is MCS6.

Of course, if the downlink channel quality measure is within a region R1, i.e. between Th02 and Th03, the MCS level is maintained unchanged in step S7. Similarly, if the downlink channel quality measure is within a region R2, i.e. between Th02 and a lower threshold value not shown in FIG. 14, the MCS level is reduced from its current level MCS6 to a lower level MCS5.

If, however, the downlink channel quality measure is within a region R3, i.e. greater than Th03, the MCS level is not automatically increased to MCS8 as in step S7 as previously described. Instead, the MCS level is maintained at its current level MCS6 when the CRC result is a failure, and only increased to MCS8 when the CRC result is a pass. In this way, selection of a higher MCS level, although suggested by the threshold value comparison, is prevented if the signal is not received successfully.

Figure 7:
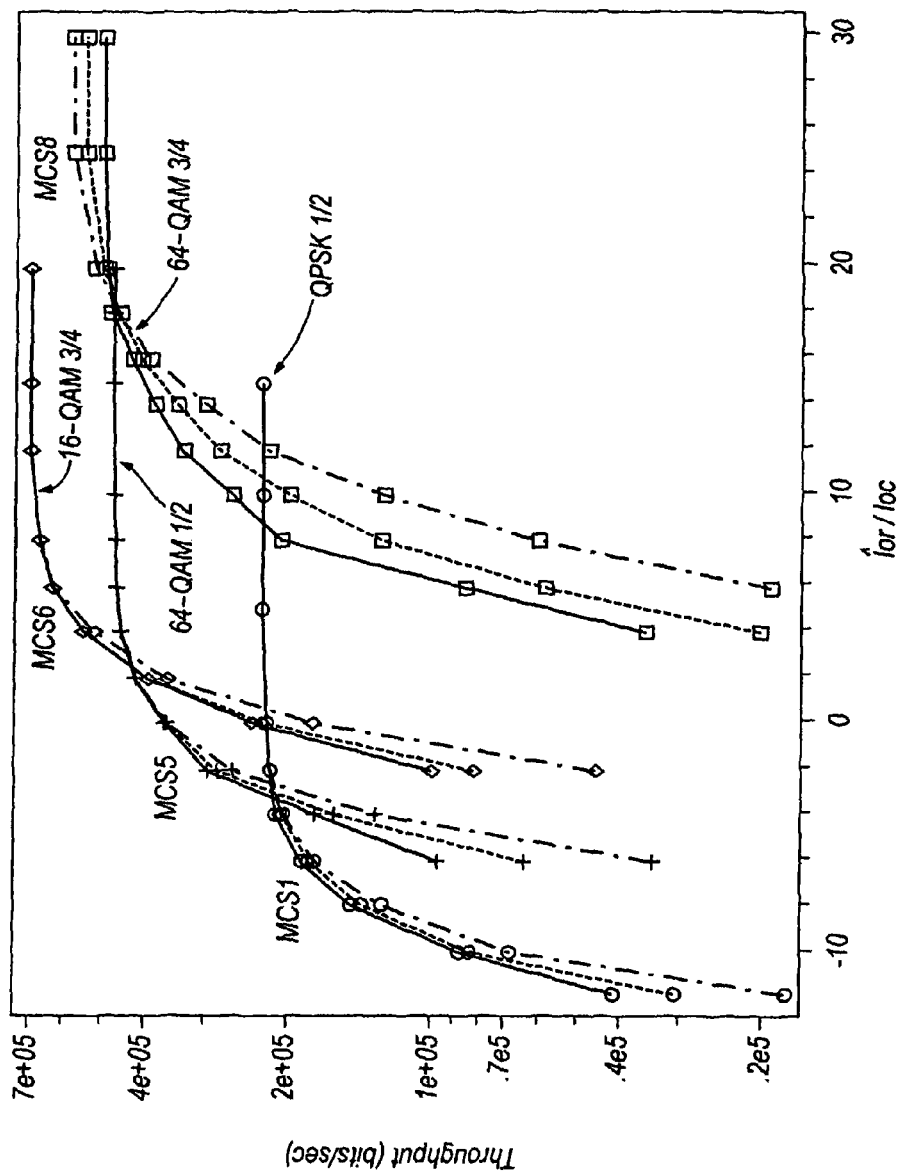
FIG. 7 is another graph for illustrating how different path conditions affect the operation of an adaptive modulation and coding technique.

As indicated above, the value α (or pair of values $\alpha_1$ and $\alpha_2$) can be different for each threshold value. A typical value of α is 1 dB. However, for some threshold values, it may be appropriate to make a large, or at least to make one of $\alpha_1$ and $\alpha_2$ large in relation to the other. For example, FIG. 7, discussed in the introduction, showed that when the path conditions are two equal-gain paths, and the fading model is a Rayleigh fading model, MCS6 always achieves a greater throughput than MCS8. In other words, the threshold value Th03 for selecting between MCS6 and MCS8 is redundant, which is equivalent to it having an infinite value. This suggests that Th03 can vary in a very wide range. In this case $\alpha_2$ for Th03 can be chosen to be arbitrarily large or even infinite.

The upward amount ΔUp and downward amount ΔDown are preferably set such that $$\Delta\text{Down} = \Delta\text{Up} \frac{FER}{1 - FER}, \quad (1)$$

where FER is a target frame error rate.

The target frame error rate may be different for each different threshold value. A FER value of around 10 to 15% may be considered typical. The target FER could alternatively be a target FER value for the currently-selected MCS level, for example a target value for a quality measure in the middle of the band of quality measures over which that MCS level is selected.

It is also possible to make one or both of the upward amount ΔUp and the downward amount ΔDown dependent upon a difference between the present downlink channel quality measure and the threshold value being adjusted. For example, $$\Delta\text{Up} = \frac{\Delta Up_0}{\text{Max}\{a, b(|SIR - Thx|)\}} \quad (2)$$

where $\Delta Up_0$ is an initial value of ΔUp, Thx is the threshold value being adjusted, SIR is the present downlink channel quality measure, and a and b are constants. Here a>0 (a sensible value could be 0.25 to 1) and b≥0.

Figure 15A:
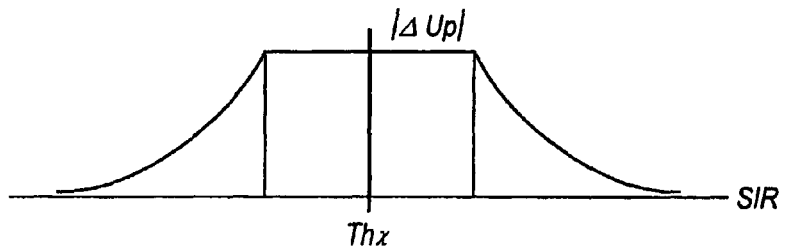
FIGS. 15(A) and 15(B) are schematic diagrams for use in explaining how to set an upward amount used in the FIG. 8 method.

This leads to a relationship between ΔUp and a difference between SIR and Thx as shown in FIG. 15(A). The constant b controls the slope of the side portions in FIG. 15(A), and the constant a controls the level at which ΔUp is capped. The relationship between ΔUp and ΔDown may be the same as in equation (1) above.

Figure 15B:
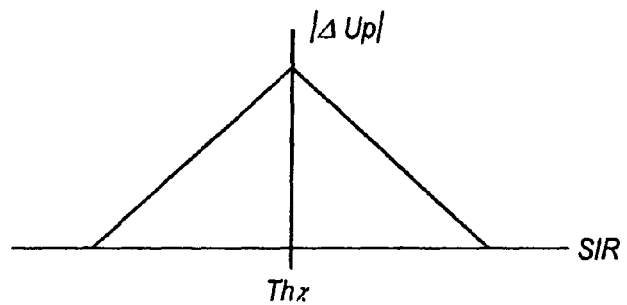

Alternatively, $$\Delta\text{Up} = (\Delta Up_0) * \max\{0, \beta - b(|SIR - Thx|)\} \quad (3)$$

where β and b are constants and b≥0. The constant β represents a threshold adjustment bandwidth similar to α, and it is possible to set β=α. Equation (3) results in a relationship between ΔUp and the difference between SIR and Thx as shown in FIG. 15(B). Equation (1) may be used to set ΔDown in this case also.

Equations (2) and (3) have the effect of increasing ΔUp (and ΔDown) when the downlink channel quality measure becomes closer to one of the current threshold values.

In the first embodiment described with reference to FIG. 8, the adjustment of the threshold values and the selection of the MCS level was made in the UE. However, it is not necessary for these operations to be carried out in the UE. It is also possible for one or both of these operations to be carried out in the base station, as will now be described in relation to a second embodiment of the present invention.

Figure 6:
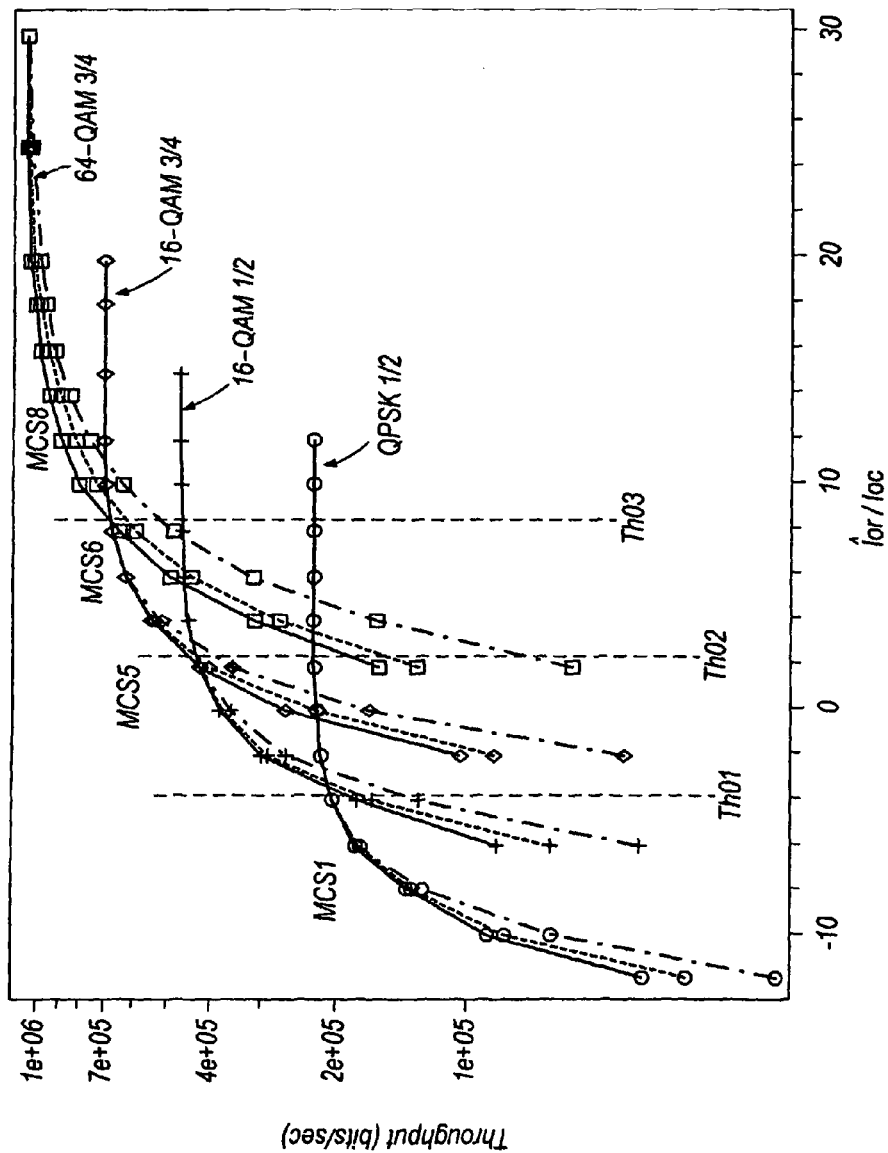
FIG. 6 is a graph corresponding to FIG. 4 for illustrating how a UE speed affects operation of an adaptive modulation and coding technique.
Figure 16:
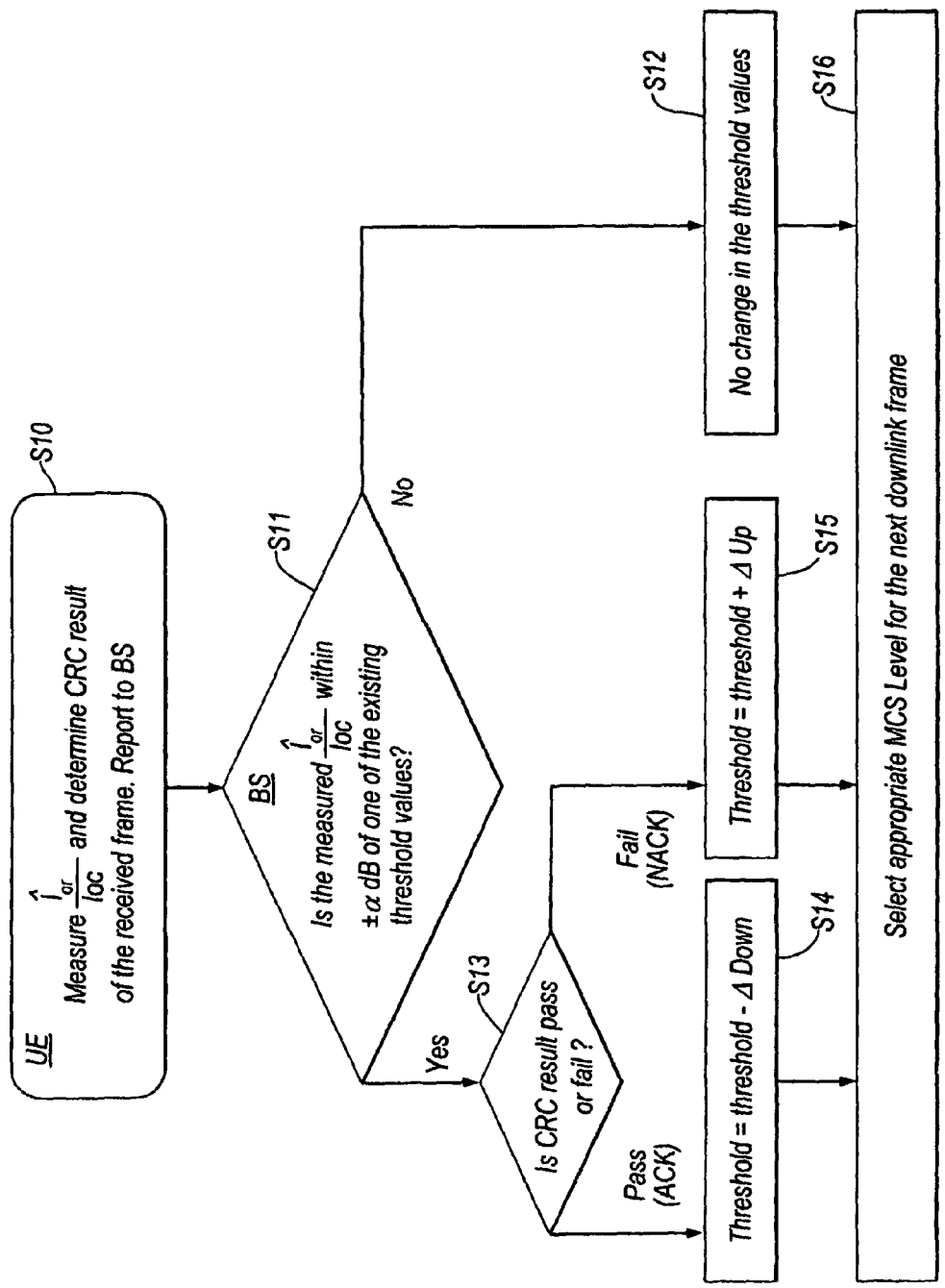
FIG. 16 is a flowchart for use in explaining an AMCS method according to a second embodiment of the present invention.

Referring to FIG. 16, in a first step S10 the UE produces a measure of downlink channel quality and also carries out a cyclic redundancy check on the current frame of the HS-DSCH. The downlink signal quality measure and the CRC result are reported by the UE to the base station via the HS-DPCCH. The base station then carries out steps S11 to S15, which correspond respectively to the steps S2 to S6 in FIG. 6, except that the operations are in this case carried out in the base station rather than in the UE.

In step S16 the base station selects the MCS level for the next downlink frame based on the threshold values (in the same way as the UE did in step S7 in FIG. 8).

In both the first and second embodiments the MCS selection made according to the downlink channel quality measure (step S7 or S16) may be overridden by the base station, for example depending on the amount of data waiting at the base station for transmission to the UE concerned.

Although in the examples described above the available MCS levels were MCS1, MCS5, MCS6 and MCS8, it will be appreciated that any two or more different MCS levels may be made available in embodiments of the present invention. A table showing the characteristics of MCS levels 1 to 8 as an example is presented in FIG. 17.

Figure 18A:
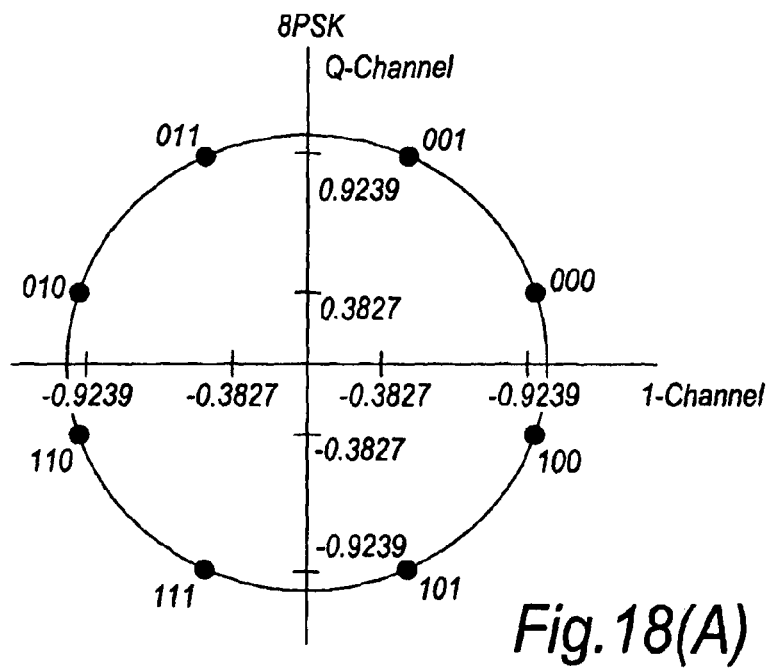
FIGS. 18(A) to 18(C) present respective I-Q diagrams showing constellation points for example MCS levels.
Figure 18B:
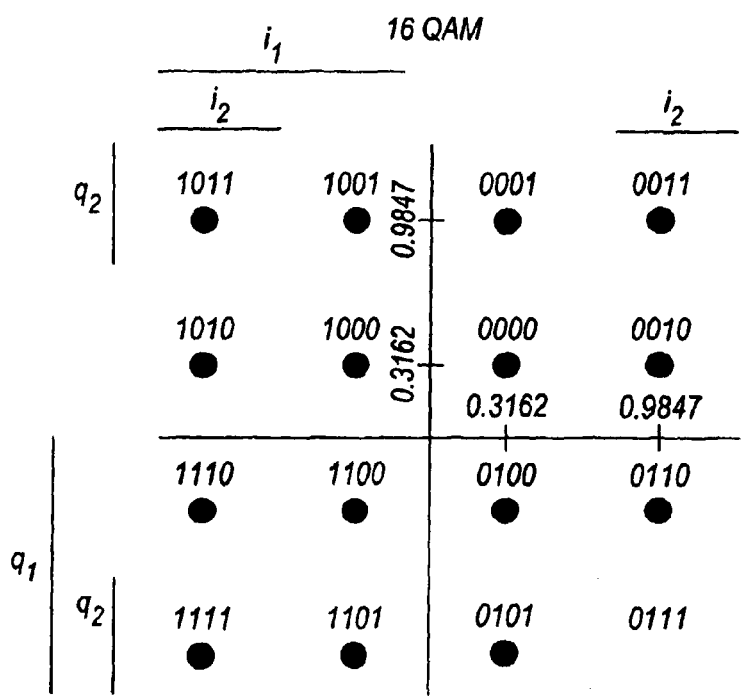
Figure 18C:
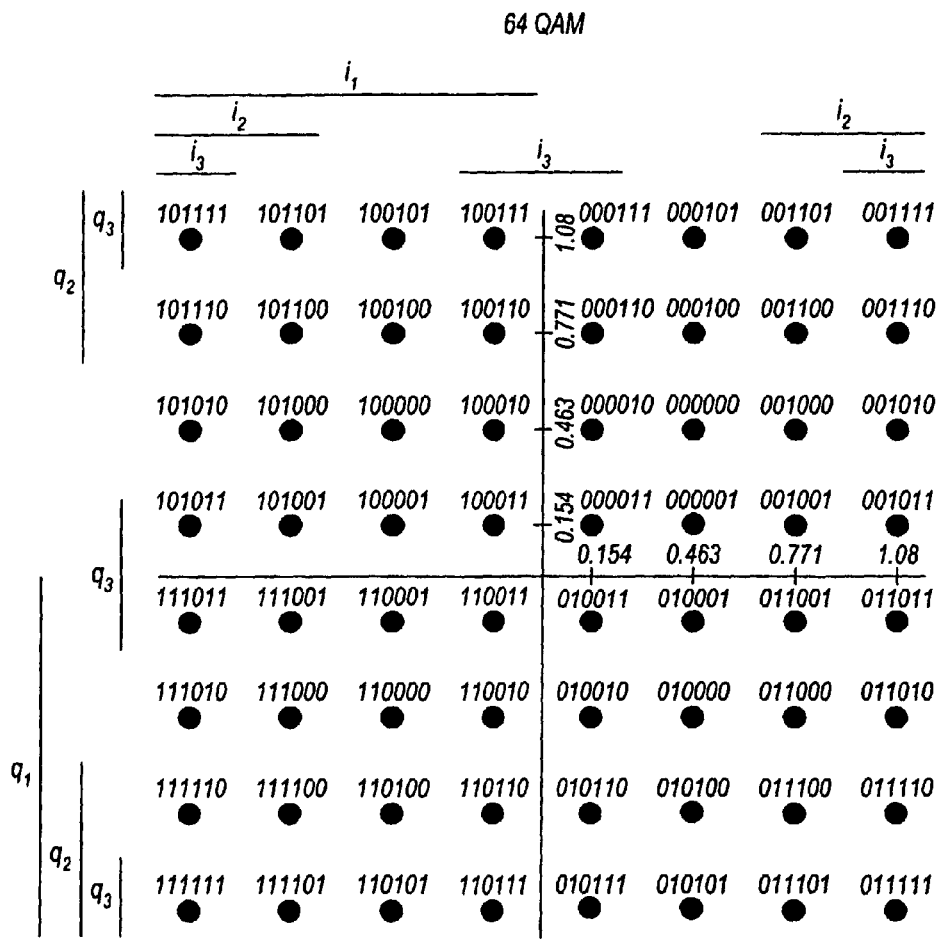

As is well known in the art, different modulation schemes involve different numbers of bits per modulated symbol. Quadrature phase shift keying (QPSK) has 2 bits per symbol, 8 phase shift keying (8 PSK) has 3 bits per symbol, 16 quadrature amplitude amplitude modulation (16 QAM) has 4 bits per symbol, and 64 quadrature amplitude amplitude modulation (64 QAM) has 6 bits per symbol. Each scheme results in $2^n$ constellation points, where n is the number of bits per symbol. The constellation points in I-Q signal space are shown for 8 PSK, 16 QAM and 64 QAM in FIGS. 18(A) to (C) respectively.

Although an example of the present invention has been described above in relation to a wideband CDMA network having an asynchronous packet mode, it will be appreciated that the present invention can also be applied to any other networks in which AMCS can be used. These networks could be, or could be adapted from, other CDMA networks such as an IS95 network. These networks could also be, or be adapted from other mobile communication networks not using CDMA, for example networks using one or more of the following multiple-access techniques: time-division multiple access (TDMA), wavelength-division multiple access (WDMA), frequency-division multiple access (FDMA) and space-division multiple access (SDMA).

Those skilled in the art will appreciate that a microprocessor or digital signal processor (DSP) may be used in practice to implement some or all of the functions of the base station and/or user equipment in embodiments of the present invention.

What is claimed is:

1. A user equipment, for use in a wireless communication system, said user equipment comprising:
   a measuring unit to measure a quality of a received signal in the user equipment;
   a reporting unit to report the quality of the received signal to a transmitter when transformation of the quality of the received signal into a modulation and coding scheme is not conducted based on the quality of the received signal by the user equipment and to report a selected modulation and coding scheme to the transmitter when a selection of the modulation and coding scheme is conducted based on the quality of the received signal by the user equipment;

a receiver to receive modulation and coding scheme information from the transmitter even if the user equipment reports the modulation and coding scheme to the transmitter, the modulation and coding scheme information indicating which modulation and coding scheme is applied to data transmission from the transmitter to the user equipment.

2. The user equipment of claim 1, wherein the modulation and coding scheme is selected based on the measured signal reception quality.

3. The user equipment of claim 1, wherein the received signal quality is measured by the receiver.

* * * * *